US006684724B2

United States Patent
Narasimhiah et al.

(10) Patent No.: US 6,684,724 B2
(45) Date of Patent: Feb. 3, 2004

(54) SHAPE MEMORY ALLOY STEP DRIVE MECHANISM FOR PROVIDING STEP MOTION TO A SYSTEM

(75) Inventors: Viswanatha Narasimhiah, Bangalore (IN); Murali Parathasarathy Iyengar Talkao, Bangalore (IN)

(73) Assignee: Indian Space Research Organization, Karnata (IN)

( * ) Notice: Subject to any disclaimer, the term of this patent is extended or adjusted under 35 U.S.C. 154(b) by 132 days.

(21) Appl. No.: 09/982,164

(22) Filed: Oct. 16, 2001

(65) Prior Publication Data

US 2002/0069941 A1 Jun. 13, 2002

Related U.S. Application Data

(63) Continuation of application No. PCT/IN00/00070, filed on Jul. 28, 2000.

(30) Foreign Application Priority Data

Feb. 17, 2000 (IN) ..................................... 121/MAS/2000

(51) Int. Cl.[7] ............................................... F16H 29/00
(52) U.S. Cl. ...................... 74/118; 74/125.5; 74/112; 74/129; 74/577 S
(58) Field of Search ........................... 74/111, 112, 116, 74/117, 118, 119, 125.5, 126, 128, 129, 577 R, 577 S; 60/527, 528, 529

(56) References Cited

U.S. PATENT DOCUMENTS 2,923,165 A * 2/1960 Patzer .......................... 74/126
3,572,569 A * 3/1971 Cimijotti et al. .............. 74/112
5,150,770 A    9/1992 Secci

FOREIGN PATENT DOCUMENTS

EP    045 250    7/1981
JP    6-249129   9/1994

* cited by examiner

Primary Examiner—Jack Lavinder
Assistant Examiner—Thomas Williams
(74) Attorney, Agent, or Firm—Pennie & Edmonds LLP

(57) ABSTRACT

A shape memory alloy step drive mechanism includes at least one shape memory alloy element (1) with a fixed end, the other end being connected to one end of a lever (2). The lever (2) is provided with a pawl (4) which is located to move on the teeth of a ratchet wheel (5) mounted on a main shaft (6) along with the lever (2). A stopper pin (7) is provided which also guides the pawl (4) on the ratchet wheel (5). A bias spring (9) is provided on a mandril on the main shaft (6) for returning the lever (2) to its original position. A detent wheel (8) with at least one detent lever (10) is mounted on the main shaft (6) to provide the detent torque required to hold the main shaft (6) in position when the lever (2) returns to its original position. A pair of support brackets (11) are provided for supporting and holding the various components together in an assembly.

7 Claims, 2 Drawing Sheets

SHAPE MEMORY ALLOY STEP DRIVE MECHANISM FOR PROVIDING STEP MOTION TO A SYSTEM

This is a continuation of PCT/IN00/00070 filed Jul. 29, 2000.

TECHNICAL FIELD

The invention provides a shape memory alloy step drive mechanism for providing step motion to a system.

BACKGROUND ART

Many step drive mechanisms are known in the art. Almost all of them uses electromagnetic components. In certain precise applications such as in space applications it is desirable to have non-magnetic components in such step drive mechanism. The invention provides a step drive mechanism which does not use any magnetic component. The step drive mechanism according to the invention uses a shape memory alloy element. Shape memory alloy is an alloy which is plastically deformed at a suitable temperature recovers fully or partially its original shape on subsequent heating, by solid state phase changes in the alloy. The shape memory alloy element is heated by passing electric current using pulses in order to actuate the step motion.

DISCLOSURE OF THE INVENTION

The invention provides a step drive mechanism comprising at least one shape memory alloy element with a fixed end, the other end of the shape memory alloy element being connected to one end of a lever, lever being provided with a pawl which is located to move on the teeth of a ratchet wheel mounted on a main shaft along with the lever, a stopper pin which also guides the pawl on the ratchet wheel, a bias spring provided on a mandril on the main shaft for returning the lever to its original position, a detent wheel with at least one detent lever mounted on the main shaft to provide the detent torque required to hold the main shaft in position when the lever returns to its original position and a pair of support brackets for supporting and holding the said components together in an assembly.

The desirable step movement of the main shaft is achieved by pulse width modulated heating of the shape memory alloy element which ensures uniform heating and long life of the shape memory alloy element. In a prefered embodiment two shape memory alloy elements are used one for the step movement in clock wise direction and the other for step movement in the anti-clock wise direction.

BRIEF DESCRIPTION OF THE DRAWINGS

The invention will now be described with reference to the accompanying drawings.

BEST MODE FOR CARRYING OUT THE INVENTION

Figure 1:
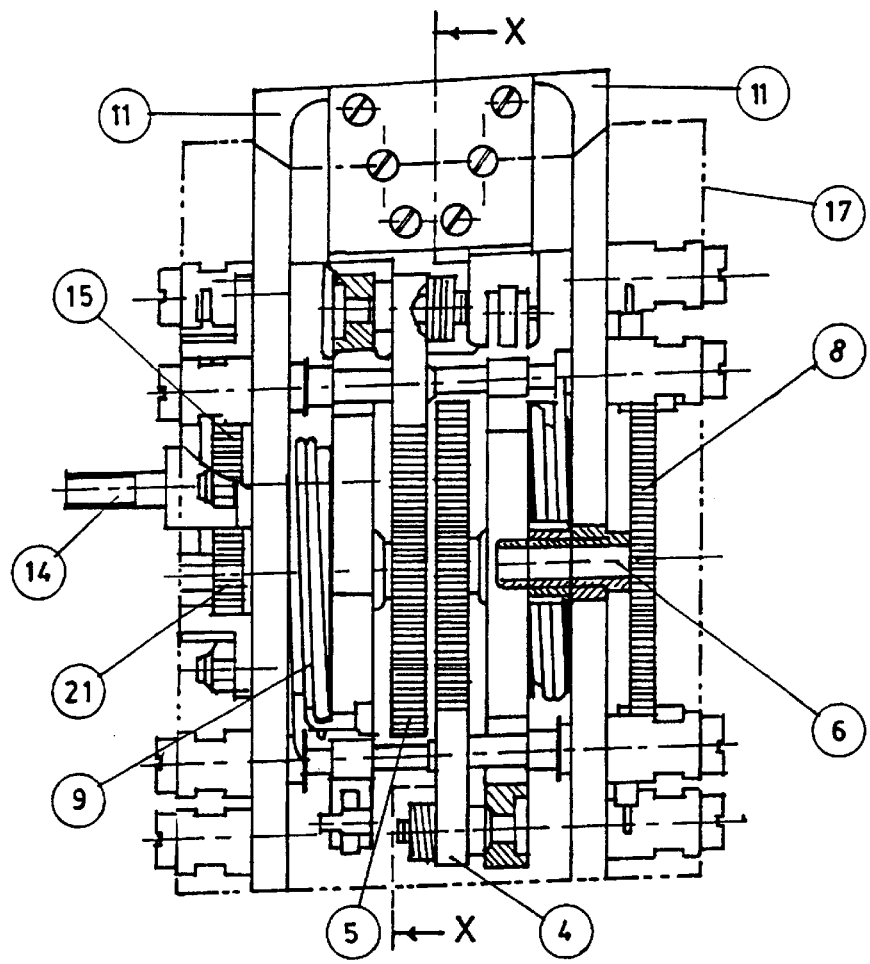
FIG. 1 shows the step drive mechanism according to the invention.
Figure 2:
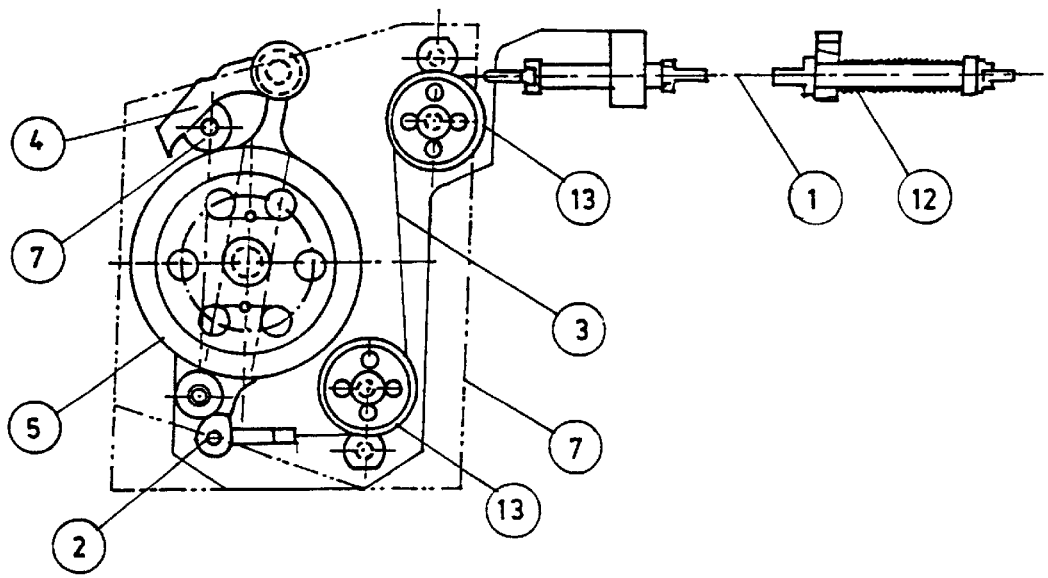
FIG. 2 shows the sectional view of the step drive mechanism shown in FIG. 1 along the sectional line X—X.
Figure 3:
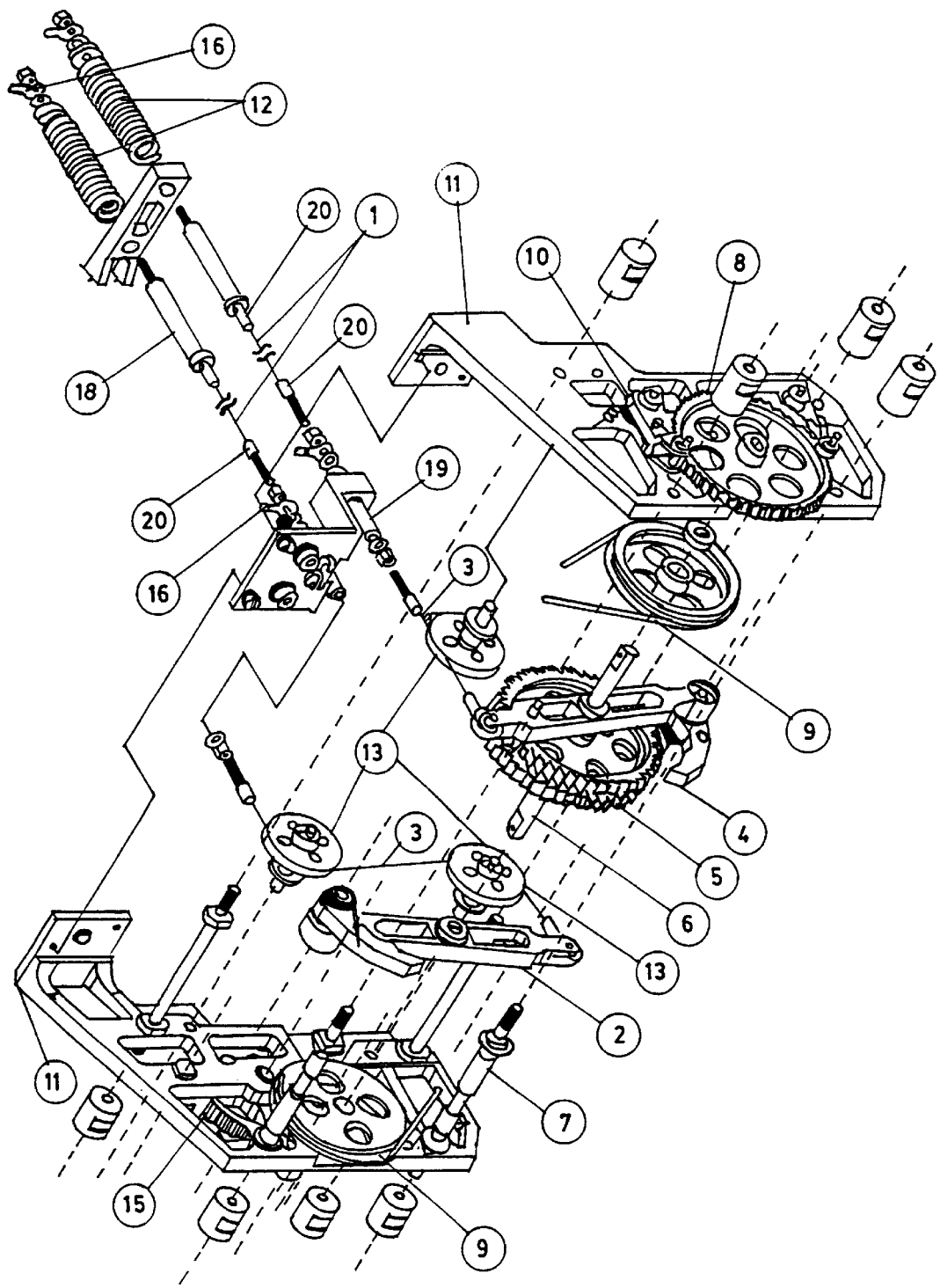
FIG. 3 shows the exploded view of a prefered step drive mechanism according to the invention.

The step drive mechanism comprises at least one shape memory alloy element (1) with one of its end fixed. The fixed end is preferably fixed to a spring loaded mandril (18) provided with a load limiting spring (12) to avoid build up of load in the shape memory alloy element (1). The other end of the shape memory alloy element (1) is connected to one end of a lever (2) through an insulator and a flexible cord (3) passing over guided pullies (13). The lever is mounted on a main shaft (6) along with a rachet wheel (5). The other end of the lever (2) is provided with a pawl (4) located to move over the teeth of the ratchet wheel (5). A stoper pin (7) with guides for guiding the pawl (4) is provided for stoping the movement of the lever (2) and disengaging the pawl (4) from the ratchet wheel (5), allowing the lever to come back to the original position due to the action of a bias spring (9) provided on a mandril on the main shaft (6) on the side of the lever (2) opposite to that of the ratchet wheel (5). A detent wheel (8) with a detent lever (10) is mounted on the main shaft (6) to provide the detent torque required to hold the main shaft (6) in position when the lever (2) returns to its original position. A pair of brackets (11) hold and support the components of the step drive mechanism when assembled. In order to obtain the step rotation to the main shaft in both direction two shape memory alloy elements with one rachet wheel for clock wise movement and another ratchet wheel for anti-clockwise movement may be used as a prefered embodiment of the invention. Preferably an output shaft (14) may be provided coupled through a gear (15) and a pinion (21) attached to the main shaft (6) for achieving smaller step motion. The shape memory alloy elements (1) are provided with end terminals (20) and electrical connecting terminals (16) at both ends for passing current through the shape memory alloy elements and heating them. The whole assembly may be provided with a protection cover (17) if desired.

INDUSTRIAL APPLICABILITY

Typical composition of shape memory alloy used in a prototype and its specification are given below:

| | |
|---|---|
| Composition | Nickel-55.0% by weight |
| | Titanium-Balance |
| | Impurities-Less than .03% |
| Actuation | Actuation temperature under 15 ksi |
| Temperature | or 100 Mpa load Recovery/Contraction |
| | temperature: 90 ± 15 Deg. C. |
| | Extension/cooling temperature: |
| | 70 ± 20 Deg. C. |

Wire diameter is selected based on drive torque requirement.

The step drive mechanism according to the invention was used to drive solar flaps in communication satellite. Typical data observed on such a system is given below.

| | |
|---|---|
| 1. SMA wire | 0.1 to 0.35 mm dia and 200–500 mm long |
| 2. Developed linear force | 500–2000 gms |
| 3. Output drive torque | 10–25 Ncm |
| 4. Drive step size | 2–16 deg |
| 5. Direction of rotation | both clockwise and anti clockwise |
| 6. Mass of the drive mechanism | 190 grams |

The step drive mechanism according to the invention can be adapted for various applications where a simple accurate and non-magnetic step drive mechanism is required. The control of step motion is accurate and simple. Pulse width modulation can be used for electrical heating of the shape memory alloy element to obtain an improved operation life cycle for the shape memory alloy element.

We claim:

1. A shape memory alloy step drive mechanism comprising at least one shape memory alloy element (1) with a fixed end, the other end of the shape memory alloy element being connected to one end of a lever (2), said lever (2) being provided with a pawl (4) which is located to move on the teeth of a ratchet wheel (5) mounted on a main shaft (6) along with the lever (2), a stopper pin (7) which also guides the pawi (4) on the ratchet wheel (5), a bias spring (9) provided on a mandrill on the main shaft (6) for returning the lever (2) to its original position, a detent wheel (8) with at least one detent lever (10) mounted on the main shaft (6) to provide the detent torque required to hold the main shaft (6) in position when the lever (2) returns to its original position and a pair of support brackets (11) for supporting and holding the said components together in an assembly.

2. The step drive mechanism as claimed in claim 1, wherein first and second shaped memory alloy elements are provided with fixed ends, the second shaped memory alloy element being configured to provide movement in a direction opposite to that provided by the first shaped memory alloy element.

3. The step drive mechanism as claimed in claim 1, wherein the fixed end of the shape memory alloy element is provided with a load limiting spring (12).

4. The step drive mechanism as claimed in any one of the previous claim 1, wherein the flexible cord (3) connecting one end of the shape memory alloy element (1) to the lever (2) is passed through guide pullies (13).

5. The step drive mechanism as claimed in claim 1, wherein an output shaft (14) is provided which is coupled through a reduction gear (15) to the main shaft (6).

6. The step drive mechanism as claimed in claim 1, wherein the shape memory alloy element is provided with electrical connecting terminals (16) for passing current through it.

7. The step drive mechanism as claimed in claim 1, wherein a protection cover (17) is provided for the step drive mechanism.

* * * * *